INVENTOR.
WILLIAM D. HOUGHTON
BY Eugene M. Whitacre
Attorney

INVENTOR.
WILLIAM D. HOUGHTON
BY
Eugene M. Whitacre
Attorney

July 9, 1968 W. D. HOUGHTON 3,392,233
MAGNETIC RECORDING OF SAMPLED FREQUENCY DIVIDED
TELEVISION SIGNALS
Filed Sept. 18, 1964 4 Sheets-Sheet 3

INVENTOR.
WILLIAM D. HOUGHTON
BY
Eugene M. Whitacre
Attorney

INVENTOR.
WILLIAM D. HOUGHTON
BY
Eugene M. Whitacre
ATTORNEY

3,392,233
MAGNETIC RECORDING OF SAMPLED FREQUENCY DIVIDED TELEVISION SIGNALS

William D. Houghton, Princeton, N.J., assignor to Radio Corporation of America, a corporation of Delaware Filed Sept. 18, 1964, Ser. No. 397,565
15 Claims. (Cl. 178—6.6)

ABSTRACT OF THE DISCLOSURE

A video signal to be recorded is divided into two signals corresponding of two different frequency bands. One of the two signals is then delayed for one horizontal TV line. The two signals are then sequentially sampled to produce a signal train of signals which are recorded on a single track of a moving tape.

This invention relates to apparatus for recording and reproducing signals in a wide range of frequencies on a recording medium and more particularly to a system for recording and reproducing television or video signals.

In order to achieve the frequency response necessary for faithful reproduction of video signals at a reasonable tape speed, it has heretofore been proposed to split the signals into two or more frequency bands, modulate one of the bands and record said bands on separate parallel tracks of a magnetic tape. One of the chief difficulties encountered in this type of method or system is that distortion is likely to appear in the reproduced signals. This is due in part to the difficulty in keeping the several tracks in proper and continuous alignment during playback.

It is therefore an object of the present invention to provide an improved system for recording on and reproducing from a single track of a recording medium moving at a reasonable speed, substantially the entire frequency band of a video signal.

Another object of the invention is to provide an improved recording system for video signals which minimize the need for critical correlation between the recording apparatus and any playback unit sought to be used.

According to one form of the present invention, the video signal to be reproduced is divided into two frequency bands, one of which is used to modulate a carrier. One of the two resultant signals is then delayed for a period corresponding to an integral number of horizontal television lines. The two signals are then sequentially sampled to produce a single train of signals which are recorded on a single track of a moving recording medium.

In accordance with one embodiment of the playback portion of the invention, the record signal is reproduced as two signals, one of which is delayed by an amount equal to that which was introduced during recording. These two signals are then synchronously sampled to produce two separate signal trains corresponding respectively to the original frequency bands. The signal train corresponding to the frequency band that was not delayed during recording is then delayed by an amount equal to that which was introduced during recording. The modulated carrier band is then demodulated and combined with the unmodulated frequency band to form a composite video signal.

The novel features which are believed to be characteristic of the invention are set forth with particularity in the appended claims. The invention itself, however, both as to its organization and method of operation, together with further object and advantages thereof, will be better understood from the following description considered in conjunction with the accompanying drawings, in which:

The present invention will be explained with reference principally to those parts of a magnetic recording system which involve the recording and reproducing of video signals, and therefore, any description of the adjuncts to magnetic recorders such as biase and erasure, the details of which are well known to those skilled in the art, but which have no bearing on this invention, have been omitted.

Figure 1:
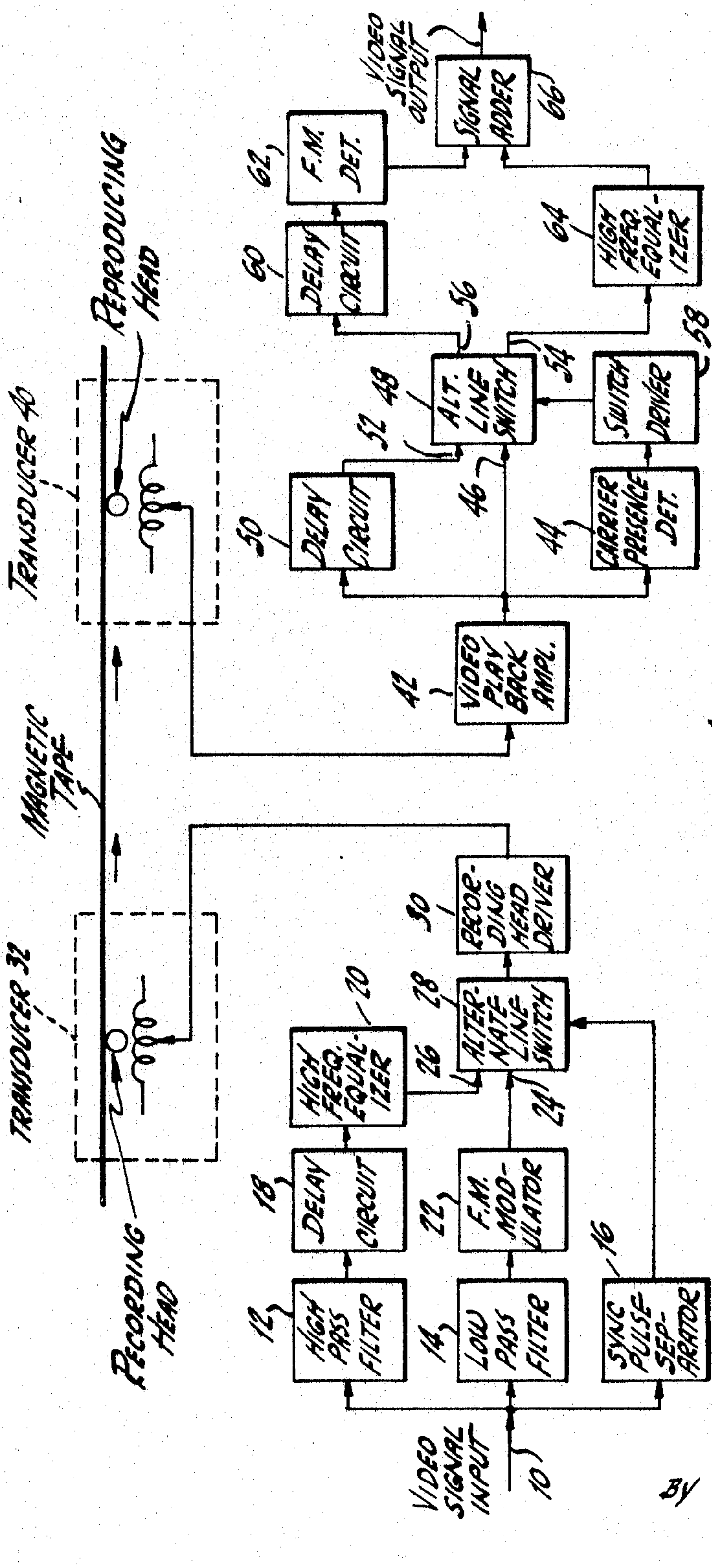
FIGURE 1 is a block diagram showing one form of a video recording and reproducing system of the present invention.

Referring now to FIGURE 1, a video signal 10 to be recorded, such as a television signal is simultaneously applied to a high pass filter 12, a low pass filter 14, and a synchronizing pulse separator 16. The high pass filter 12 may have a pass band of 300 kc. to 4.5 mc. and the low pass filter 14 may have a pass band of 10 c.p.s. to 300 kc. The output signals from the filters then comprise two bands of frequencies corresponding respectively to the high and low frequency components of the information contained in a composite television picture signal. The output wave from the synchronizing pulse separator 16 comprises a series of pulses corresponding to the horizontal synchronizing pulses contained in the original composite video signal.

The filters 12 and 14 may be active or passive networks which have relatively flat frequency pass band regions. The phase shift throughout the pass bands should be substantially constant and independent of frequency.

The high frequency components are then applied to a delay circuit 18. The delay circuit 18 serves to delay the high frequency information for a period equal to one horizontal television line. The high frequency output signal from the delay circuit 18 is then passed through an equalizing network 20 to obtain the desired characteristics for recording.

The low frequency components are used to frequency modulate a carrier wave in modulator 22 in accordance with known techniques, and the modulated carrier wave, hereafter for convenience called the low frequency components, is then fed along with the output signal from the high frequency equalizing amplifier 20 to separate input circuits 24 and 26 respectively of a sampling device or alternate line switch 28. Switch 28 is keyed by pulses supplied by the synchronizing pulse separator 16. The output from the switch 28 is applied to a recording head driver 30 and then to a suitable transducer 32 for recording on a magnetic tape. The action of the switch 28 is such that it alternately feeds the low frequency components and the high frequency components to the recording head driver 30 respectively for periods equal in time to one horizontal television line. The output signal of the driver 30, therefore is representative of the high and low frequency components of alternate lines of the video signal.

Figure 5:
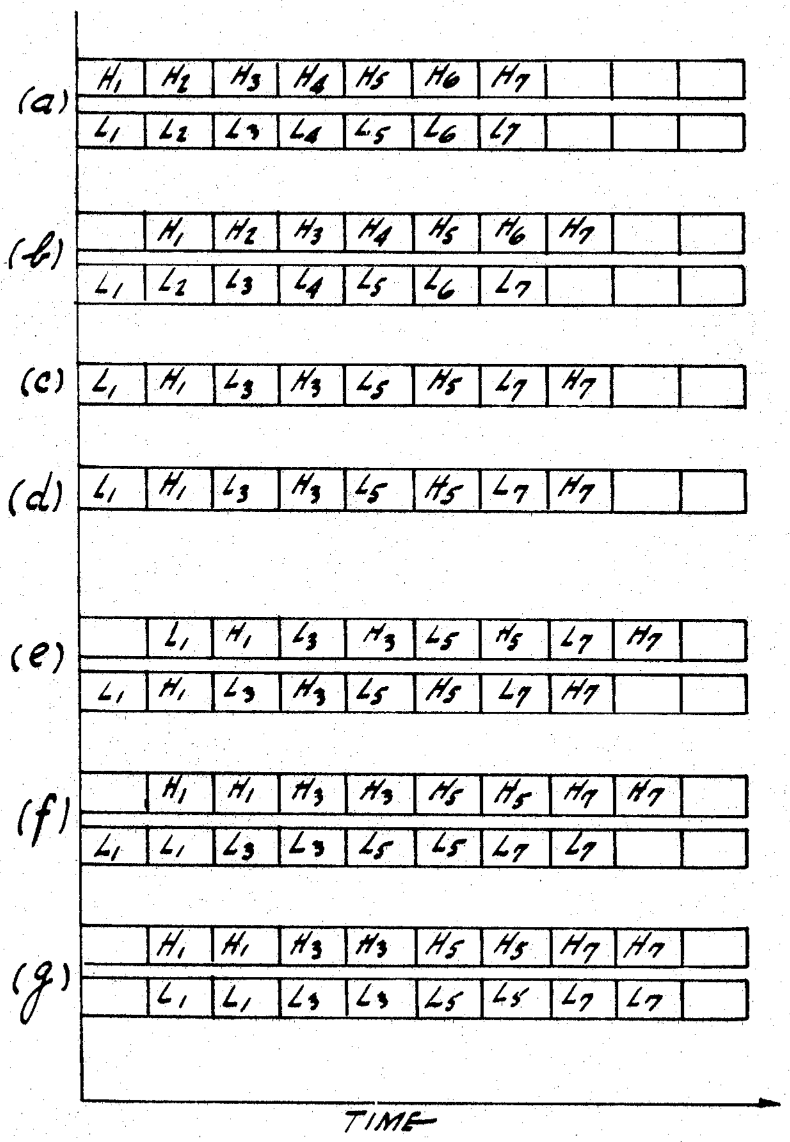
FIGURE 5 is a chart useful in describing the operation of the video recording and reproducing system shown in FIGURE 1.

The operation of the recording portion of the invention just described is illustrated in FIGURE 5. FIGURE 5*a* represents the high and low frequency components H and L of successive lines of a video signal appearing at the output of the high pass filter 12 and the low pass filter 14 respectively. The subscript numbers represent the succession of scanning lines. FIGURE 5*b* represents the high and low frequency components of successive lines of a video signal appearing at the input circuits 26 and 24 respectively of alternate line switch 28. It will be noted that the high frequency information is delayed by an interval equal to one horizontal television line so that the highs for the television line one occur simultaneously with the lows for the television line two. FIGURE 5*c* illustrates the sequential arrangement of the high and low frequency components of successive lines of a video signal after sampling by the alternate line switch 28. FIGURE 5*c* also illustrates the pattern that is recorded.

Referring again to FIGURE 1 for a description of a reproducing system embodying the invention, the recorded information is converted into an electrical signal corresponding to successive lines of high and low frequency information, by means of a transducer 40 which is coupled to a video playback amplifier 42. The output of the amplifier 42 is applied in parallel to a carrier presence detector 44, a first input terminal 46 of an alternate line switch 48 and through a delay circuit 50 to the second input terminal 52 of the alternate line switch 48. The delay circuit 50 serves to delay the incoming signal for a period equal to one horizontal television line. The switch 48 has two output terminals 54 and 56 and is designed to alternately switch the signals applied to input terminals 46 and 52 to selected output terminals 54 and 56 in response to pulses derived from the carrier presence detector 44 as will be hereinafter described.

The carrier presence detector 44 produces a timing pulse output in response to the presence of the frequency modulated carrier wave representing alternate lines of the signal output of the amplifier 42. The timing pulse output from the carrier presence detector 44 is one horizontal television line in duration and is coupled to activate the switch 48 through a switch driver amplifier 58. The switch 48 is keyed by the pulses from the carrier presence detector 44 so that the low frequency information components always appear at the output terminal 56 of the switch 48 and the high frequency information components always appear at the output terminal 54 of said switch 48.

The action of the switch 48 is such that the input terminals 52 and 46 are first coupled to the output terminals 56 and 54 respectively. After switching occurs, the input terminals 52 and 46 are then coupled to the output terminals 54 and 56 respectively. The action is cyclic with the switching rate being equivalent to the time duration of one horizontal television line.

The delay circuit 50 causes low frequency information to appear at one of the switch 48 input terminals at the same time that high frequency information appears at the other of the switch 48 input terminals. However, the respective high and low frequency components appearing at the input terminals 46 and 52 will interchange their positions, but the switch 48 is actuated so that the low frequency information is always applied to the output terminal 56 and the high frequency information is applied to the output terminal 54.

The low frequency output signal from the terminal 56 of the switch 38 is passed through a delay circuit 60 and applied to an FM detector 62 wherein the low frequency information is recovered. The delay produced by the delay circuit 60 is equal to one horizontal television line so as to provide a proper time alignment between the corresponding high frequency signal produced at the terminal 54 of switch 48. The FM detector may be of known design. The positions of the delay circuit 60 and the FM detector 62 may be interchanged without affecting the operation of the circuit.

The signal appearing at the high frequency output terminal 54 of the switch 48 is passed through a high frequency equalizing network 64 and applied to an adding network 66. The detected low frequency information output signal obtained from the FM detector 62 is also applied to the adding network 66 for combination with corresponding high frequency information components.

The composite video signal then appears at the output of the adding network 66.

The composite video signal obtained at the output of the adding network 66 may then be applied to a television transmitter or local television monitor for viewing.

The operation of the reproducing system can best be understood by referring again to FIGURE 5. FIGURE 5*d* illustrates in block form the reproduced information signal output of the transducer 32. The information is displayed as successive lines of high and low frequency video components from alternate lines of the original video signal. FIGURE 5*e* represents the input signals appearing at the input terminals 52 and 46 respectively of alternate line switch 48 and shows the signal applied to terminal 52 delayed by one horizontal television line. FIGURE 5*f* represents the sequential arrangement of the high and low frequency output signals produced as a result of the operation of the switch 48. FIGURE 5*g* represents the sequential arrangement of the high and low frequency signals after the low frequencies have been delayed by one horizontal television line. The low frequency components are therefore shown in proper alignment with their respective high frequency components and can now be added to produce the desired composite video signal.

Figures 2, 3:
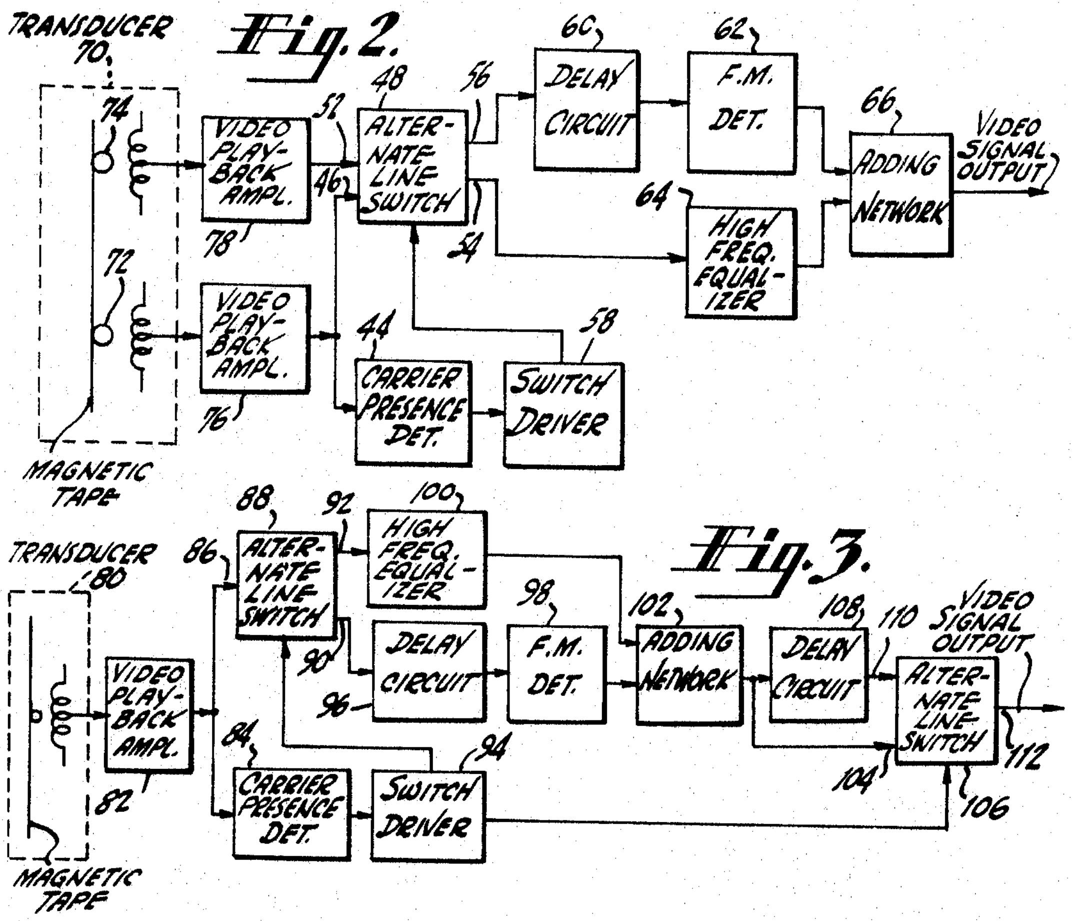
FIGURE 2 is a block diagram showing a modified version of the reproducing system of FIGURE 1.
FIGURE 3 is a block diagram showing another form of the producing system of the present invention.

FIGURE 2 shows another embodiment of the reproducing portion of the invention and contains elements similar to those in FIGURE 1 which are similarly numbered. In the embodiment of FIGURE 2, the delay circuit 50 between playback amplifier 42 and the input terminal 52 of the alternate line switch 48 in FIGURE 1 is eliminated by the use of a transducer 70 having a reproducing head containing two elements 72 and 74. For a given tape speed, the head is designed to provide the desired one horizontal television line delay by reproducing two sections of the record by gaps that have a spacing equivalent to one horizontal television line.

The signal obtained from element 72 is passed through the playback amplifier 76 to the carrier presence detector 44 and the input terminal 46 of switch 48. The signal obtained from element 74 is passed through the playback amplifier 78 to the input terminal 52 of switch 48. Thereafter, the configuration and operation of the system is the same as previously described above.

FIGURE 3 illustrates another embodiment of a reproducing system compatible with the recording system of FIGURE 1 for reproducing the desired composite video signal. The reproducing system operates as follows: the recorded information is converted into an electrical signal by a transducer 80 and then applied to the input circuit of a video playback amplifier 82. The output circuit of the video playback amplifier 82 is coupled to a carrier presence detector 84 and also to the input terminal 86 of an alternate line switch 88 having two output terminals 90 and 92 respectively. The output of the carrier presence detector 84 is coupled to a switch driver 94. The switch 88 is then activated by signals obtained from the switch driver 94 in response to the frequency modulated carrier component contained in alternate line periods of the record signal. The operation of switch 88 is such that the input signal is sequentially switched between output terminals 90 and 92 so that only the low frequency component of the record signal appears at the output terminal 90 and only the high frequency component of the record signal appears at the output terminal 92.

A delay circuit 96 is connected to the output terminal 90 of the switch 88. The delay circuit 96 serves to delay the low frequency component appearing at output 90 of the switch 88 for a period equal to one horizontal television line. The delayed low frequency output signal obtained from the delay circuit 96 is then applied to an FM detector 98 to recover the low frequency information. The high frequency output from the terminal 92 of the switch 88 is equalized in an equalizing network 100 and then fed to an adding network 102. The low frequency output from the detector 98 is also applied to the adding network 102 for combination with corresponding high frequency information components.

A portion of the combined high and low frequency output from the adding network 102 is applied to a first input terminal 104 of an alternate line switch 106, while another portion of the output from the adding circuit 102 is delayed in a delay circuit 108 by an amount equal to one horizontal television line and then applied to a second input terminal 110 of the switch 106. Switch 106 is activated by pulses obtained from the switch driver 94 in a similar manner as previously described for the switch 88. The operation of switch 106 is such that the signals applied to terminals 104 and 110 are alternately fed to the switch output terminal 112 for a time duration equal to one horizontal television line. Therefore, the signal appearing at the output terminal 112 of the switch 106 will be made up of twice recurring alternate lines of the original video signal.

Figure 6:
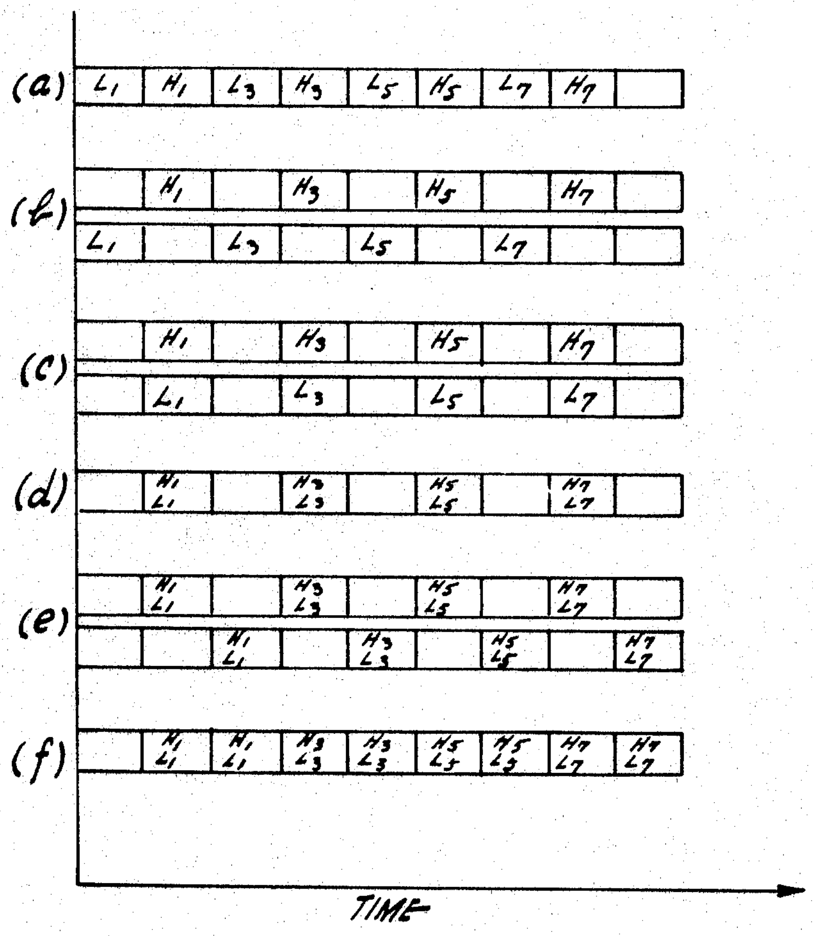
FIGURE 6 is a chart useful in describing the operation of the reproducing system shown in FIGURE 3.

Operation of the above described embodiment of the invention is illustrated in FIGURE 6 wherein the signals appearing at the outputs of successive stages of the reproducing system are shown in block form. In FIGURE 6*a* the information signal obtained at the output of the transducer 80 is illustrated. The information is displayed as successive lines of high and low frequency video components from alternate lines of the original video signal. FIGURE 6*b* illustrates the successive lines of alternate high and low frequency components appearing at the output terminals 93 and 90 respectively of the switch 88. FIGURE 6*a* represents the sequential arrangement of the high and low frequency signals applied to the inputs of the adding network 102. The low frequency components are shown delayed for a period equal to one horizontal television line and in proper time alignment with their corresponding high frequency components. FIGURE 6*d* is representative of the composite high and low frequency signal obtained at the output of the adding network 102. FIGURE 6*e* represents the composite signals applied to the input terminals 104 and 110 of the switch 106. The signal applied to the input terminal 110 is shown delayed for a period equal to one horizontal television line. FIGURE 6*f* represents the resulting video signal obtained at the output of switch 106.

Figure 4:
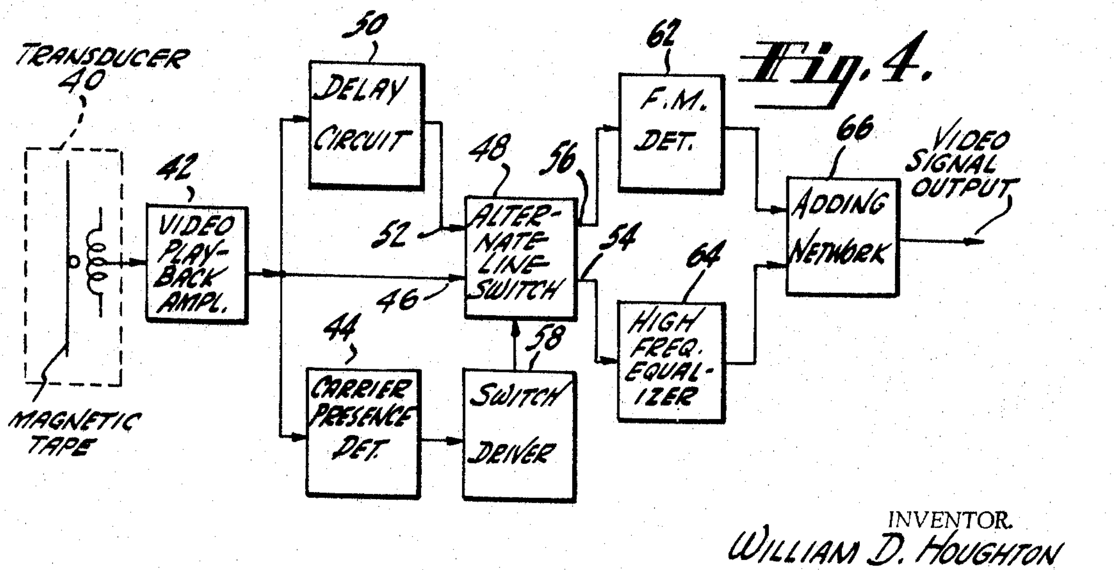
FIGURE 4 is a block diagram showing still another form of the reproducing system of the present invention.

The reproducing system illustrated in FIGURE 4 is similar to that shown in FIGURE 1, except that the delay circuit 60 coupled to the output 56 of the switch 48 in FIGURE 1 has been eliminated, with a resulting misalignment of alternate lines of the video signal output of the adding network 56. In the reproduction of a television picture, this misalignment of alternate lines results in a decrease in picture clarity as compared with the system shown in FIGURE 1.

While the embodiments describing the above invention are based on a one horizontal television line delay being imparted to the high and low frequency components of a signal in a line sequential manner, the same principles may be used in a field sequential arrangement wherein a complete field of highs may be superimposed on a delayed field of lows and vice versa. Also, the same switching arrangement may be used in a system where the low frequency components are recorded as amplitude modulation on a carrier or where the low frequency components are directly recorded on the record medium.

What is claimed is:

1. A recording system for recording on, and reproduction from, a recording medium, a video signal, including picture information components and recurrent synchronizing information components, said system comprising:

means responsive to said synchronizing information components for generating timing pulses;

means for separating said video signal into first and second frequency bands;

first delay means connected to said separating means for imparting a time delay equal to at least one horizontal television line to said first frequency band;

sampling means controlled by said timing pulses;

means for applying said second frequency band and said delayed first frequency band to said sampling means for providing an output signal that alternates between said first and second frequency bands;

means coupled to said sampling means for recording said output signal on said recording medium;

means including a transducer for providing a pair of electrical signals from said recording medium which are representative of the combined record signal, but which are displaced from each other in time by the time interval of at least one horizontal television line;

a first signal translating channel for signals corresponding to said first frequency band;

a second signal translating channel for signals corresponding to said second frequency band;

sampling means coupling said first and second signal translating channels to said means including a transducer for applying the signals corresponding to said first frequency band to said first signal translating channel and for applying the signals corresponding to said second frequency band to said second signal translating channel;

second delay means connected to said second signal translating channel for imparting a time delay equal to at least one horizontal television line to the signals from said second signal translating channel; and means for combining the signals from said first signal translating channel with the delayed signals from said second signal translating channel.

2. A recording system for the recording of a video signal on a recording medium, said signal including picture information components and recurrent synchronizing information components, said system comprising:

means responsive to said synchronizing information components for generating timing pulses;

means for separating said video signal into a pair of frequency bands, each frequency band occupying a portion of the frequency spectrum of the representative original signal;

delay means connected to said separating means for imparting a time delay equal to at least one horizontal television line to one of said frequency bands;

modulating means connected to said delay means and responsive to said one of said bands for producing a frequency modulated carrier wave output;

sampling means controlled by said timing pulses;

means for applying the output signal from said modulating means and the other of said frequency bands from said separating means to said sampling means for providing any output signal that alternates between said modulated carrier wave and said unmodulated frequency band signal; and means for recording said output signal on said recording medium.

3. A recording system for the recording of a video signal on a recording medium, said signal including picture information components and recurrent synchronizing information components, said system comprising:

means responsive to said synchronizing information components for generating timing pulses;

means for separating said video signal into high and low frequency bands, each frequency band occupying a portion of the frequency spectrum of the representative original signal;

delay means connected to the low frequency output of said separating means for imparting a time delay equal to at least one horizontal television line to said low frequency band signal;

modulating means connected to the output of said delay means and responsive to said low frequency band signal for producing a frequency modulated carrier wave output signal;

sampling means controlled by said timing pulses;

means for applying said low frequency modulated carrier wave signal and the high frequency output signal from said separating means to said sampling means for providing an output signal from said sampling means that alternates between said modulated carrier wave signal and said high frequency band signal; and means for recording said output signal on said recording medium.

4. A recording system for recording on a recording medium, electrical signals comprising:

a terminal means for connections to a source of said electrical signals, said signals having high frequency components, low frequency components and recurrent synchronizing pulses components;

means coupled to said terminal means for separating said signals into their respective components;

means coupled to the output of said separating means for imparting a given delay to the high frequency components with respect to the low frequency components and for frequency modulating a carrier wave by said low frequency components;

means for recording said signals on a single track of said recording medium; and switch means responsive to said synchronizing pulses and connected between the recording means and the output of said delay and modulating means for alternately feeding high and low frequency signals to said recording means.

5. A recording system for recording on, and reproduction from a recording medium, a video signal including picture information components and recurrent synchronizing information components, said system comprising:

means responsive to said synchronizing information components for generating timing pulses;

means for separating said video signal into first and second frequency bands, each frequency band occupying different portions of the frequency spectrum of the representative original signal;

delay means connected to said separating means for imparting a time delay equal to at least one horizontal television line to said first frequency band;

sampling means controlled by said timing pulses;

means for applying said second frequency band and said delayed first frequency band to said sampling means for providing an output signal that alternates between said first and second frequency bands;

means for recording said output signal on said recording medium;

means for electrically reproducing the signal recorded on said recording medium;

a first switching means having an input terminal and first and second output terminals, said input terminal being connected to the output of said electrically reproducing means for alternatively switching said frequency band signals between said first and second output terminals so that said second frequency band signal appears at said first output terminal;

a first delay means connected to the first output terminal of said first switching means for imparting a delay equal to at least one horizontal television line to said second frequency band signal;

adding means connected between the second output terminal of said first switching means and the output terminal of said first delay means for adding the signals appearing at said output terminals;

a second delay means connected to the output of said adding means for imparting a delay equal to at least one horizontal television line to the signal appearing at said output;

an output circuit for receiving the reproduced video signal; and switching means having its output connected to said output circuit and its input alternatively switched between the input and output of said second delay means so as to provide reproduction of said video signal.

6. A reproducer for use with a television video recording medium having recorded thereon in a single track, video signals represented sequentially as low frequency components and then high frequency components for equal line durations comprising:

means including a transducer responsive to signals in said track for separating the signals representing low frequency components from the signals representing high frequency components;

delay means connected to said means including a transducer for aligning the high frequency components in a predetermined manner with said low frequency components; and means connected to said delay means for combining said separate signals so that the high frequency components are added to the low frequency components.

7. A reproducer for use with a television video recording medium having recorded thereon in a single track, video signals represented sequentially as low frequency components and then high frequency components for equal line durations comprising:

means for reproducing signals from said track;

means coupled to said reproducing means for separating said reproduced signals into said low frequency components and said high frequency components; and means coupled to said separating means for combining said high frequency components with said low frequency components in a predetermined time relationship.

8. A reproducer as defined in claim 7 wherein said means for combining includes a delay circuit for aligning the high frequency components for a given line with the low frequency components for that line.

9. A reproducer for use with a television video recording medium having recorded thereon in a single track, video signals represented sequentially as low frequency components for one horizontal television line duration and then high frequency components for one horizontal television line duration comprising:

means including a transducer for deriving electrical signals corresponding to the signals recorded on said medium;

means connected to said means including a transducer for separating the signals representing low frequency components from the signals representing high frequency components; and means including a one horizontal television line delay circuit connected to said separating means for combining said separate signals so that the high frequency components for a given line are added to the corresponding low frequency components for that line.

10. A reproducer for use with a recording medium having recorded thereon in a single track, alternate bands of signals corresponding respectively to separate frequency bands of an information signal comprising:

means including a transducer for providing a pair of electrical signals from said recording medium which are representative of the combined recorded signal, but which are displaced from each other in time by the time interval of one of said alternate bands;

a first signal translating channel for signals corresponding to one of said separate frequency bands;

a second signal translating channel for signals corresponding to another of said separate frequency bands;

sampling means coupling said first and second signal translating channel to said means including a transducer for applying the signals corresponding to one of said separate frequency bands to said first signal translating channel and for applying the signals corresponding to another of said separate frequency bands to said second signal translating channel; and means for combining the signals from said first and second signal translating channels.

11. A reproducer for use with a recording medium having recorded thereon in a single track alternate bands of signals corresponding respectively to separate frequency bands of an information signal comprising:

means including a transducer for providing a pair of electrical signals from said recording medium which are representative of the combined recorded signal, but which are displaced from each other in time by the time interval of one of said alternate bands;

a first signal translating channel for signals corresponding to one of said separate frequency bands;

a second signal translating channel for signals corresponding to another of said separate frequency bands;

sampling means coupling said first and second signal translating channels to said means including a transducer for applying the signals corresponding to one of said separate frequency bands to said first signal translating channel and for applying the signals corresponding to another of said separate frequency bands to said second signal translating channel:

synchronizing means responsive to one of said separate frequency bands coupled to said sampling means for controlling the sampling rate of said sampling means; and means for combining the signals from said first and second signal translating channels.

12. A video reproducer for use with a television video recording medium having recorded thereon in a single track, video signals represented sequentially by low frequency modulated carrier signals for one horizontal television line duration and then high frequency signals for one horizontal television line duration comprising:

means including a transducer for deriving electrical signals corresponding to the signals recorded on said medium;

a first signal translating channel for low frequency modulated carrier signals;

a second signal translating channel for high frequency signals;

delay means connected to said means including a transducer for imparting a time delay equal to one horizontal television line to said electrical signals;

sampling means coupling said first and second signal translating channels to said first delay means and to said means including a transducer for applying said low frequency modulated carrier signals to said first signal translating channel and for applying said high frequency signals to said second signal translating channel;

synchronizing means coupled between said means including a transducer and said sampling means for controlling the sampling rate of said sampling means;

frequency modulation detecting means connected to said first signal translating channel, said detecting means being responsive to the low frequency modulated carrier signal for deriving the low frequency signal information contained therein; and means for combining the signals from said second signal translating channel with the low frequency signal information from said detecting means.

13. A video reproducer for use with a television video recording medium having recorded thereon in a single track, video signals represented sequentially as low frequency modulated carrier signals for one horizontal television line duration and then high frequency signals for one horizontal television line duration comprising:

means including a transducer for deriving electrical signals corresponding to the signals recorded on said medium;

a first signal translating channel for low frequency modulated carrier signals;

a second signal translating channel for high frequency signals;

first delay means connected to said means including a transducer for imparting a time delay equal to one horizontal television line to said electrical signals;

sampling means coupling said first and second signal translating channels to said first delay means and to said means including a transducer for applying said low frequency modulated carrier signals to said first signal translating channel and for applying said high frequency signals to said second signal translating channel;

synchronizing means coupled between said means including a transducer and said sampling means for controlling the sampling rate of said sampling means;

second delay means connected to said first signal translating channel for imparting a time delay equal to one horizontal television line to said low frequency modulated carrier signals;

frequency modulation detecting means connected to said second delay means, said detecting means being responsive to low frequency modulated carrier signals for deriving the low frequency signal information contained therein; and means for combining the signals from said second signal translating channel with the low frequency signal information from said detecting means.

14. A video reproducer for use with a television video recording medium having recorded thereon in a single track, video signals represented sequentially as low frequency modulated carrier signals for one horizontal television line duration and then high frequency signals for one horizontal television line duration comprising:

means including a transducer having a dual element reproducing head and two output circuits for providing a pair of electrical signals which are representative of the signals recorded on said medium, but which are displaced from each other in time by the time interval of one horizontal television line;

a first signal translating channel for low frequency modulated carrier signals;

a second signal translating channel for high frequency signals;

sampling means coupling said first and second signal translating channels to the outputs of said means including a transducer for applying said low frequency modulated carrier signals to said first signal translating channel and for applying said high frequency signals to said second signal translating channel;

synchronizing means coupled between one of the outputs of said means including a transducer and said sampling means for controlling the sampling rate of said sampling means;

delay means connected to said first signal translating channel for imparting a time delay equal to one horizontal television line to said low frequency modulated carrier signals;

frequency modulation detecting means connected to said delay means, said detecting means being responsive to the low frequency modulated carrier signals for deriving the low frequency signal information contained therein; and means for combining the signals from said second signal translating channel with the low frequency signal information from said detecting means.

15. A video reproducer for use with a television video recording medium having recorded thereon in a single track, video signals represented sequentially as low frequency modulated carrier signals for one horizontal television line duration and then high frequency signals for one horizontal television line duration comprising:

means including a transducer for deriving electrical signals corresponding to the signals recorded on said medium;

a first signal translating channel for low frequency modulated carrier signals;

a second signal translating channel for high frequency signals;

first sampling means coupling said first and second signal translating channels to said means including a transducer for applying said low frequency modulated carrier signals to said first signal translating channel and for applying said high frequency signals to said second signal translating channel;

first delay means connected to said first signal translating channel for imparting a time delay equal to one horizontal television line to said low frequency modulated carrier signals;

frequency modulation detecting means connected to said first delay means, said detecting means being responsive to the low frequency modulated carrier signals for deriving the low frequency signal information contained therein;

means for combining the signals from said second signal translating channel with the low frequency signal information from said detecting means;

second delay means connected to said combining means for imparting a time delay equal to one horizontal television line to said combined signals;

an output circuit for receiving the reproduced video signals;

second sampling means coupling said output circuit to said combining means and said second delay means for alternately applying said combined signals and said delayed combined signals to said output circuit; and synchronizing means coupled between said means including a transducer and said first and second sampling means for controlling the sampling rate of said first and second sampling means.

References Cited

UNITED STATES PATENTS

| | | |
|---|---|---|
| 3,084,224 | 4/1963 | Sanford. |
| 2,207,854 | 9/1965 | Johnson. |
| 2,280,270 | 10/1966 | Allington. |

ROBERT L. GRIFFIN, *Primary Exmainer.*

JOHN W. CALDWELL, *Examiner.*

H. W. BRITTON, *Assistant Examiner.*